United States Patent
Hirata et al.

(10) Patent No.: US 9,746,856 B2
(45) Date of Patent: Aug. 29, 2017

(54) MULTI-HOLE ORIFICE PLATE FOR FLOW CONTROL, AND FLOW CONTROLLER USING THE SAME

(71) Applicant: FUJIKIN INCORPORATED, Osaka (JP)

(72) Inventors: Kaoru Hirata, Osaka (JP); Atsushi Hidaka, Osaka (JP); Masaaki Nagase, Osaka (JP); Ryousuke Dohi, Osaka (JP); Nobukazu Ikeda, Osaka (JP); Kouji Nishino, Osaka (JP); Katsuyuki Sugita, Osaka (JP); Takashi Hirose, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 59 days.

(21) Appl. No.: 14/785,789

(22) PCT Filed: Apr. 9, 2014

(86) PCT No.: PCT/JP2014/002041
§ 371 (c)(1),
(2) Date: Oct. 20, 2015

(87) PCT Pub. No.: WO2014/174782
PCT Pub. Date: Oct. 30, 2014

(65) Prior Publication Data
US 2016/0070271 A1    Mar. 10, 2016

(30) Foreign Application Priority Data

Apr. 25, 2013 (JP) .................................. 2013-091867

(51) Int. Cl.
G01F 1/42      (2006.01)
F16L 55/027    (2006.01)
G05D 7/06      (2006.01)

(52) U.S. Cl.
CPC ...... G05D 7/0635 (2013.01); F16L 55/02718 (2013.01)

(58) Field of Classification Search
CPC .................................. F16L 55/00; F15D 1/025
(Continued)

(56) References Cited

U.S. PATENT DOCUMENTS 1,330,174 A * 2/1920 De Cew .................... A23D 7/02
                                                138/44
1,398,063 A * 11/1921 Brown ...................... F02M 1/00
                                                138/40
(Continued)

FOREIGN PATENT DOCUMENTS

JP    H02-178927 A    7/1990
JP    H05-002215 U    1/1993
(Continued)

OTHER PUBLICATIONS

International Search Report, PCT/JP2014/002041, Jul. 8, 2014.

*Primary Examiner* — Patrick F Brinson
(74) *Attorney, Agent, or Firm* — Studebaker & Brackett PC

(57) ABSTRACT

A multi-hole orifice plate for flow control includes an orifice plate for controlling the flow rate of a fluid, wherein the opening area of one orifice necessary for the passage of a predetermined flow rate of fluid is divided to provide a plurality of orifices having a total opening area equal to said opening area.

12 Claims, 9 Drawing Sheets

(58) Field of Classification Search
USPC .................. 138/44, 40; 48/189.4; 73/861.61
See application file for complete search history.

(56) References Cited

U.S. PATENT DOCUMENTS

| | | | | |
|---|---|---|---|---|
| 1,503,371 | A * | 7/1924 | Meyer | F02M 1/00 123/585 |
| 1,515,408 | A * | 11/1924 | Puffer | F02M 1/00 123/590 |
| 1,797,954 | A * | 3/1931 | Greenwald | F25B 41/06 138/40 |
| 1,967,798 | A * | 7/1934 | Witte | D01D 4/022 138/44 |
| 5,295,397 | A * | 3/1994 | Hall | G01F 1/363 137/44 |
| 5,327,941 | A * | 7/1994 | Bitsakis | B01F 5/0682 138/42 |
| 5,341,848 | A * | 8/1994 | Laws | F15D 1/025 138/40 |
| 5,461,932 | A * | 10/1995 | Hall | G01F 1/42 138/40 |
| 5,791,369 | A | 8/1998 | Nishino et al. | |
| 5,918,637 | A * | 7/1999 | Fleischman | B01D 3/008 138/40 |
| 6,186,179 | B1 * | 2/2001 | Hill | F15D 1/0005 138/39 |
| 7,051,765 | B1 * | 5/2006 | Kelley | G01F 1/42 138/40 |
| 8,192,073 | B1 * | 6/2012 | Waldron | B01F 3/0807 138/40 |
| 9,200,650 | B2 * | 12/2015 | Van Buskirk | F15D 1/025 |
| 9,410,565 | B2 * | 8/2016 | Van Buskirk | F15D 1/025 |
| 2013/0084059 | A1 | 4/2013 | Ohmi et al. | |

FOREIGN PATENT DOCUMENTS

| | | |
|---|---|---|
| JP | H08-338546 A | 12/1996 |
| JP | H11-117915 A | 4/1999 |
| JP | 2000-020136 A | 1/2000 |
| JP | 2001-179136 A | 7/2001 |
| JP | 2002-213642 A | 7/2002 |
| JP | 2004-199109 A | 7/2004 |
| JP | 2005-021420 A | 1/2005 |
| JP | 2005-149075 A | 6/2005 |
| JP | 2011-185183 A | 9/2011 |
| JP | 2013-077710 A | 4/2013 |
| WO | 2013/046517 A1 | 4/2013 |

* cited by examiner

MULTI-HOLE ORIFICE PLATE FOR FLOW CONTROL, AND FLOW CONTROLLER USING THE SAME

TECHNICAL FIELD

The present invention relates to the improvement of an orifice plate for flow control and a pressure-controlled flow controller using the same. The invention particularly relates to a multi-hole orifice plate for flow control configured such that, in a pressure-controlled flow controller for use in a gas supply apparatus for a semiconductor manufacturing system, etc., the range of the pressure ratio $P_2/P_1$ between the pressure $P_1$ upstream of the orifice and the pressure $P_2$ downstream of the orifice, at which the critical expansion conditions of an orifice-passing fluid are established, can be kept wide and stable, thereby making it possible to achieve high-precision flow control over a wide flow range; and also relates to a pressure-controlled flow controller using the same.

BACKGROUND ART

When the pressure ratio $P_2/P_1$ between the pressure $P_1$ upstream of the orifice and the pressure $P_2$ downstream of the orifice is equal to or lower than the pressure ratio at which the critical expansion conditions of a gas are established, the orifice-passing gas flows at the speed of sound, and a variation in the pressure $P_2$ downstream of the orifice is not transmitted to the upstream side. As a result, when the orifice has a fixed diameter, regardless of the kind of gas, the flow rate of the gas passing through the orifice plate changes in direct proportion to the gas pressure $P_1$ upstream of the orifice.

Meanwhile, utilizing such characteristics of an orifice, a large number of fluid flow controller using an orifice have been developed.

FIG. 13 shows an example of the configuration of the pressure-controlled flow controller using an orifice previously disclosed by the present inventors. The flow controller 21 includes a control valve 22, a pressure detector 23, a temperature detector 24, an orifice 25, an arithmetic and control unit 26, amplifiers 27a and 27b, A/D converters 28a and 28b, and the like (JP-A-8-338546).

The fluid pressure $P_1$ upstream of the orifice 25 is detected by the pressure detector 23 and input to the arithmetic and control unit 26. In the arithmetic and control unit 26, the flow rate Qc is calculated using the arithmetic expression $Qc=KP_1$, while Qc is compared with the flow command value Qs, and the control signal Qy corresponding to the difference between the two, Qc–Qs, is input to an actuator 30 of the control valve 22.

In addition, the control valve 22 is opened/closed by the control signal Qy in the direction that the difference Qc–Qs approaches zero, whereby the flow rate downstream of the orifice 25 is constantly maintained at the set flow rate (flow command value) Qs.

Further, the orifice 25 is formed by making a small hole having an inner diameter of 0.01 to 0.20 mm in a metal plate having a thickness of 0.02 to 0.20 mm by pressing, electric discharge machining, or etching. The diameter of the orifice is appropriately selected according to the required gas flow rate to be controlled.

Furthermore, although electric discharge machining or etching is generally used to form an orifice 25, in some cases, the orifice is formed by so-called cutting using a drill in order to reduce the processing cost (JP-A-11-117915).

FIG. 14 shows the flow control characteristics of the pressure-controlled flow controller of FIG. 13 in the case where the gas is nitrogen gas, and shows the case where the pressure downstream of the orifice 25 is atmospheric pressure.

As clearly shown in FIG. 14, at a range where the pressure $P_1$ upstream side exceeds about twice the pressure $P_2$ on the downstream side, the relation between the flow rate Qc and $P_1$ is kept linear, and Qc is in direct proportion to the pressure $P_1$ upstream of the orifice. Thus, by automatically controlling the pressure $P_1$ upstream of the orifice, the feedback control of the flow rate through the orifice is possible. Furthermore, in FIG. 14, A shows the flow control characteristics in the case where the diameter of the orifice is $\phi 0.37$ mm, while B is in the case of $0.20\phi$.

As clearly shown in FIG. 14, when the lines A and B are both within a range of $P_2<0.5P_1$ (i.e., $P_2/P_1<0.5$), the linearity is well maintained, and the flow rate can be precisely controlled by regulating $P_1$.

However, it is known that the actual lower limit of $P_1$ at which the critical expansion conditions of a gas are established ($P_2/P_1<0.5$ or $P_1/P_2>2$) (i.e., the lower limit of $P_1$ at which the linearity is maintained) slightly changes with the inner diameter of the orifice, and the greater the diameter of an orifice is, the smaller the range of $P_2/P_1$ at which critical expansion conditions are established tends to be. That is, when $P_2$ is constant, the lower limit of the control range of $P_1$ increases.

Specifically, with an increase in the diameter of an orifice, the critical pressure ratio $P_2/P_1<0.5$ decreases to about $P_2/P_1<0.45$, and when $P_2$ is constant, the lower limit of the control range of $P_1$ increases, resulting in a smaller control range of $P_1$.

In other words, when the diameter of an orifice increases with an increase in the controlled flow rate of a flow controller, the control range of the critical pressure ratio $P_2/P_1$ becomes smaller. This results in various inconveniences in the case where, for example, the gas is supplied to a vacuum chamber of a semiconductor manufacturing system.

As mentioned above, the conventional pressure-type flow controller using an orifice plate provided with one orifice has the drawback that the pressure ratio $P_2/P_1$ at which critical expansion conditions are established varies with an increase in the diameter of the orifice, resulting in the variation of the flow (pressure) control range. Therefore, in the technical field of pressure-controlled flow controllers applied to semiconductor manufacturing systems, there has been a strong demand for the advent an orifice plate for flow control, in which even when the diameter of an orifice changes, no variation occurs in the actual pressure ratio $P_2/P_1$ at which critical expansion conditions are established; and also a pressure-controlled flow controller using the same.

CITATION LIST

Patent Literature

Patent Document 1: JP-A-8-338546
Patent Document 2: JP-A-11-117915

SUMMARY OF INVENTION

Technical Problem

A main object of the present invention is to solve the problems of conventional orifice plates for flow control and pressure-controlled flow controllers using the same mentioned above, that is, the problems that the actual pressure ratio $P_2/P_1$ at which critical expansion conditions are established varies (decreases) with an increase in the inner diameter of an orifice, whereby the control range of the pressure ratio $P_2/P_1$ becomes smaller, and also the flow control accuracy of the pressure-controlled flow controller decreases, etc., and provide an orifice plate for flow control, which is configured such that even when the inner diameter of an orifice is increased with an increase in the fluid flow rate, the pressure ratio $P_2/P_1$ in the actual flow control can always be kept constant, and also the production cost for the orifice plate can be reduced; and also provide a pressure-controlled flow controller using the same.

Solution to the Problems

First, with respect to an orifice plate having one orifice (hereinafter referred to as single-hole orifice plate), the present inventors examined the degree of actual variation of the ratio $P_2/P_1$ between the pressure $P_1$ upstream of the orifice and the pressure $P_2$ downstream of the orifice (hereinafter referred to as pressure ratio $P_2/P_1$), at which the critical expansion conditions of a fluid are established, in accordance with a change in the diameter $\phi$ of the orifice.

FIG. 1 is a system diagram of a testing device (flow measuring device) used for testing the pressure ratio $P_2/P_1$, flow characteristics and the like of a conventional single-hole orifice plate for flow control and the multi-hole orifice plate for flow control according to the present invention; 1 is a gas inlet, 2 is a pressure regulator, 3 is a pressure meter, 4 is a molblock flow meter, 5 is a pressure-controlled flow controller, 6 is a control valve, 7 is an orifice plate, 8 is a pressure detector upstream of the orifice, 9 is a pressure detector downstream of the orifice, 10 is a regulation valve for the pressure $P_2$ downstream of the orifice, 11 is an evacuation pump, $P_1$ is the pressure upstream of the orifice, and $P_2$ is the pressure downstream of the orifice. Furthermore, the maximum flow range F.S. is based on $N_2$ gas.

The orifice plates used for the test were the following three kinds: 50-μm-thick steel plates having orifices of $\phi$=67 μm, $\phi$=179 μm, and $\phi$=250 μm, respectively. The orifice of $\phi$=67 μm is used in a pressure-controlled flow controller 5 with a maximum flow range (full scale) F.S.=130 sccm, the orifice of $\phi$=250 μm is used in a pressure-controlled flow controller 5 with a maximum flow range F.S. of 850 sccm, and the orifice of $\phi$=250 μm is used in a pressure-type flow controller 5 with a maximum flow range F.S.=1600 sccm.

In the test, first, the pressure Po of the pressure meter 3 is regulated to 300 kPa abs by the pressure regulator 2. Next, the set flow rate of the pressure-controlled flow controller 5 is set at 100% F.S. (a rated flow rate), and the evacuation pump 11 is operated. Subsequently, while regulating the regulation valve 10 upstream of the evacuation pump 11 to regulate the pressure $P_2$ downstream of the orifice, the gas flow rates in the molblock flow meter 4 and the pressure-type flow controller 5 are each measured. Furthermore, $N_2$ gas was used as the test gas.

Next, using the measured flow rate Qs of the molblock flow meter 4 as the reference value, the error (set point error (S.P. %)) of the measured flow rate Qc of each pressure-controlled flow controller 5 was calculated as (Qc−Qs)×100/Qs (S.P. %). Furthermore, the flow measurement was measured at 100%, 50%, 20%, and 10% of the set flow rate of the pressure-controlled flow controller 5.

With respect to the three kinds of pressure-controlled flow controllers having different orifice diameters (F S. 130 sccm, F.S. 850 sccm, F.S. 1600 sccm), each of FIG. 2, FIG. 3, and FIG. 4 shows the relation between the pressure ratio ($P_2/P_1$) and the set point error (S.P. %) by using the set input (set flow rate) to each pressure-controlled flow controller 5 as a parameter. From the comparison of FIG. 2 to FIG. 4, it was confirmed that with an increase in the flow range (rated flow rate S.P.) and a resulting increase in the orifice diameter, the set point error (S.P. %) approaches zero, that is, the range of $P_2/P_1$ at which critical expansion conditions are established becomes smaller.

In addition, from the flow control results obtained using the testing device of FIG. 1, FIG. 5, FIG. 6, and FIG. 7 each show the relation between the set flow rate (%) of the pressure ratio $P_2/P_1$ when the set point error (S.P. %) is within ±1% and the flow linear error (F.S. %) based on the controlled flow rate at the time of 100% setting, that is, the relation between the set flow rate (%) and the linearity error (F.S. %). It was shown that within the range of the pressure ratio $P_2/P_1$ at which critical expansion conditions are established, the flow linear error F.S. % of the single-hole orifice plate is within ±1% F.S.

The present invention has been created based on the results of the flow characteristic tests as shown in FIG. 2 to FIG. 7. Noting that the smaller the diameter of the orifice of a single-hole orifice plate, the greater the range of the pressure ratio $P_2/P_1$ at which critical expansion conditions are established, the present inventors have conceived that in the case when the controlled flow rate increases, rather than increasing the diameter of the orifice of a single-hole orifice plate according to the flow rate range as conventional, when the number of orifices of a multi-hole orifice plate on which each orifice has a small diameter is changed, thereby corresponding to the increase of the controlled flow rate, the flow rate increase can be managed while the range of the pressure ratio $P_2/P_1$ at which the critical expansion conditions of the orifice-passing fluid are established is being kept maximum and constant.

A first aspect of the present invention is basically configured such that in an orifice plate for flow control, the opening area of one orifice necessary for the passage of a predetermined flow rate of fluid is divided to provide a plurality of smaller orifices having a total opening area equal to said opening area.

According to a second aspect of the present invention, in the first aspect, the plurality of orifices are formed by pressing.

According to a third aspect of the present invention, in the above first aspect, the orifice plate has a thickness of 20 to 200 μm and serves as an orifice plate for a pressure-controlled flow controller.

According to a fourth aspect of the present invention, in the above first aspect, the orifice plate has a thickness of 20 to 200 μm, the plurality of orifices each have a hole diameter of 0.010 to 0.200 mm, and the number of the plurality of orifices is 2 to 100.

According to a fifth aspect of the present invention, in the above first aspect, the plurality of orifices each has a longitudinal plane shape including a rectangular part and a trapezoidal part.

According to a sixth aspect of the present invention, in the above fifth aspect, a portion on the backside of the orifice plate having the plurality of orifices bored therein is finished by polishing.

According to a seventh aspect of the present invention, in the first aspect, when the ratio $P_2/P_1$ between the pressure ($P_1$) upstream of the orifice and the pressure ($P_2$) downstream of the orifice is equal to or lower than the pressure ratio at which the critical expansion conditions of a gas are established, the gas flow rate Q changes in direct proportion to the gas pressure ($P_1$) upstream of the orifice.

An eighth aspect of the present invention is basically configured such that in a pressure-controlled flow controller, the multi-hole orifice according to any one of the preceding aspects is used as an orifice plate for flow control.

Advantageous Effects of Invention

In the present invention, in an orifice plate for flow control configured such that a fluid flows under critical expansion conditions, and the flow rate Q of the orifice-passing fluid is in direct proportion to the pressure $P_1$ upstream of the orifice, the opening area of one orifice necessary for the passage of a desired flow rate of fluid is divided to provide a plurality of orifices having a total opening area equal to said opening area.

As a result, even when the orifice opening area increases with an increase in the controlled flow rate, the pressure ratio $P_2/P_1$ between the pressure $P_1$ upstream of the orifice and the pressure $P_2$ on the downstream side at which critical expansion conditions are established does not actually vary and is maintained at a constant value, whereby the reduction of the control range of $P_2/P_1$ (flow control range) can be effectively prevented. In addition, in a pressure-controlled flow controller using the orifice plate, it is made possible to increase the flow control range and improve the control precision.

In addition, since the plurality of orifices can be easily formed by pressing, the orifice plate can be produced at a lower cost, compared with the conventional production by laser beam machining, etc.

DESCRIPTION OF EMBODIMENTS

Hereinafter, the present invention will be described based on embodiments and drawings.

Figure 8A:
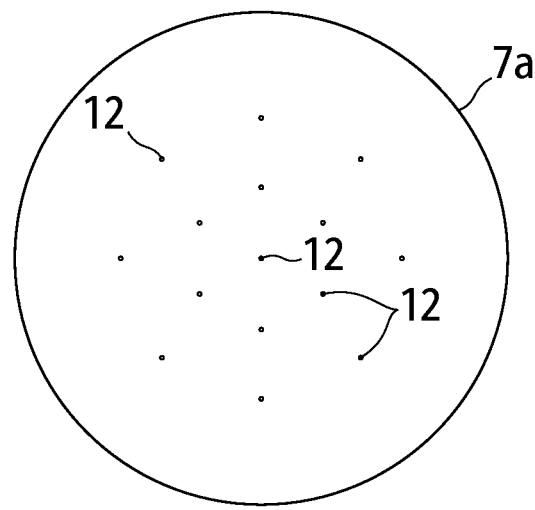
FIG. 8A shows a plane view of an example of the multi-hole orifice plate according to the present invention.
Figure 8B:
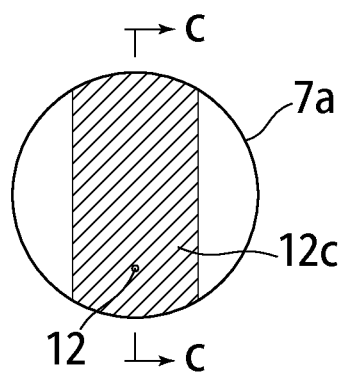
FIG. 8B shows a back view of FIG. 8A.
Figure 8C:
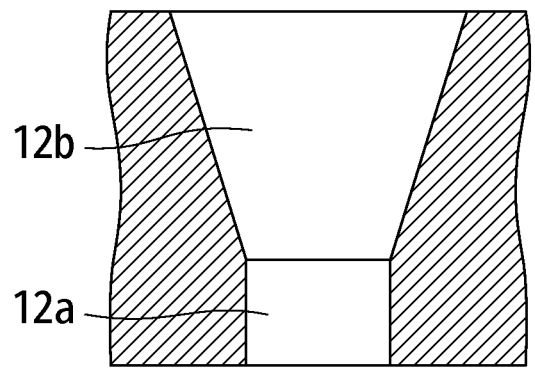
FIG. 8C shows a c-c sectional view of FIG. 8B.

FIG. 8A, FIG. 8B, and FIG. 8C show an example of the orifice plate for flow control according to the present invention; FIG. 8A is a plan view, FIG. 8B is a back view, and FIG. 8C is a c-c sectional view.

In FIG. 8A, a total of fifteen orifices 12 with a diameter of 0.085 mm are provided in an orifice plate 7a with an outer diameter of 3.5 mm and a thickness of 0.05 mm.

In addition, the longitudinal plane shape of the orifice 12 is formed by pressing to have a rectangular part 12a and a trapezoidal part 12b as shown in FIG. 8C, and the depth of the orifice 12 is 0.05 mm, which is the same as the thickness of the orifice plate 7a.

Furthermore, the portion on the back side of the orifice plate 7a, where the orifices 12 are provided, is polished in a narrow shape to form a polished surface 12c, and the front and back of the orifice plate 7a are distinguished by the polished surface 12c.

Figure 9A:
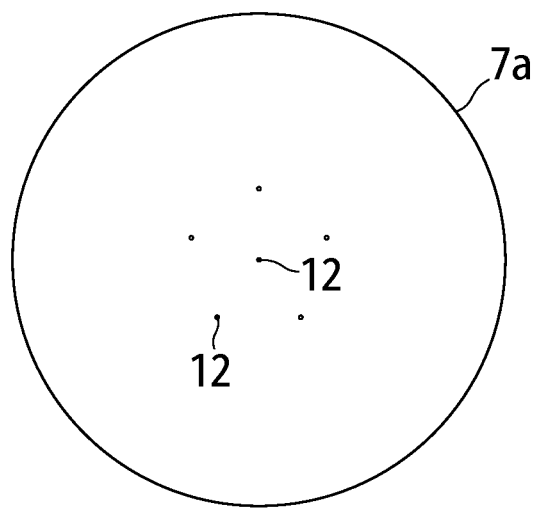
FIG. 9A is a plan view showing another example of the multi-hole orifice plate according to the present invention.
Figure 9B:
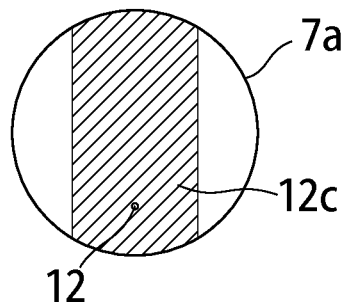
FIG. 9B shows a back view of FIG. 9A
Figure 9C:
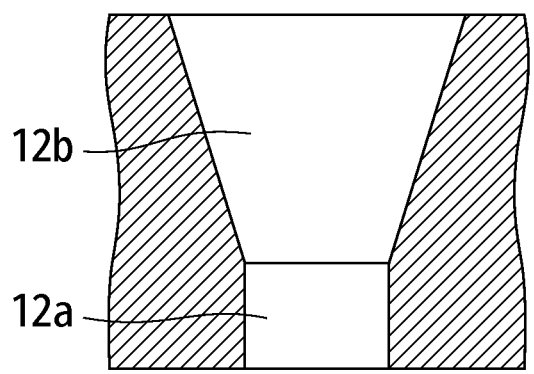
FIG. 9C shows a sectional view of FIG. 9B.

FIG. 9A, FIG. 9B, and FIG. 9C shows another example of the multi-hole orifice plate 7a for flow control according to the present invention, which is the same as the multi-hole orifice plate for flow control of FIG. 8A, FIG. 8B, and FIG. 8C, except that the number of orifices 12 is 5, and the orifices 12 each has a diameter of 0.135 mm.

Figure 10:
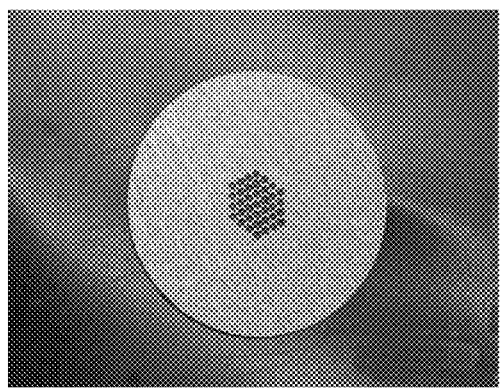
FIG. 10 is a plan view showing another example of the multi-hole orifice plate according to the present invention.

FIG. 10 is an enlarged plan view showing another example of the multi-hole orifice plate 7a for flow control according to the present invention, in which thirty-seven orifices 12 each having a diameter φ of 79 μm (0.079 mm) are provided.

The outer diameter, the thickness, and the like of the orifice plate 7a are the same as those of the orifice plates 7a of FIG. 8A and FIG. 9A.

The diameter φ of 79 μm of the orifice 12 is equal to the diameter of the orifice of a single-hole orifice plate 7 of Pressure-Controlled Flow Controller F180 manufactured by Fujikin Incorporated, which is a control orifice plate with a rated flow rate of 180 sccm (F.S.).

Accordingly, the F.S. flow rate of the multi-hole orifice plate 7a for flow control of FIG. 10 is equivalent to 180 sccm×37=6.660 sccm.

Figure 1:
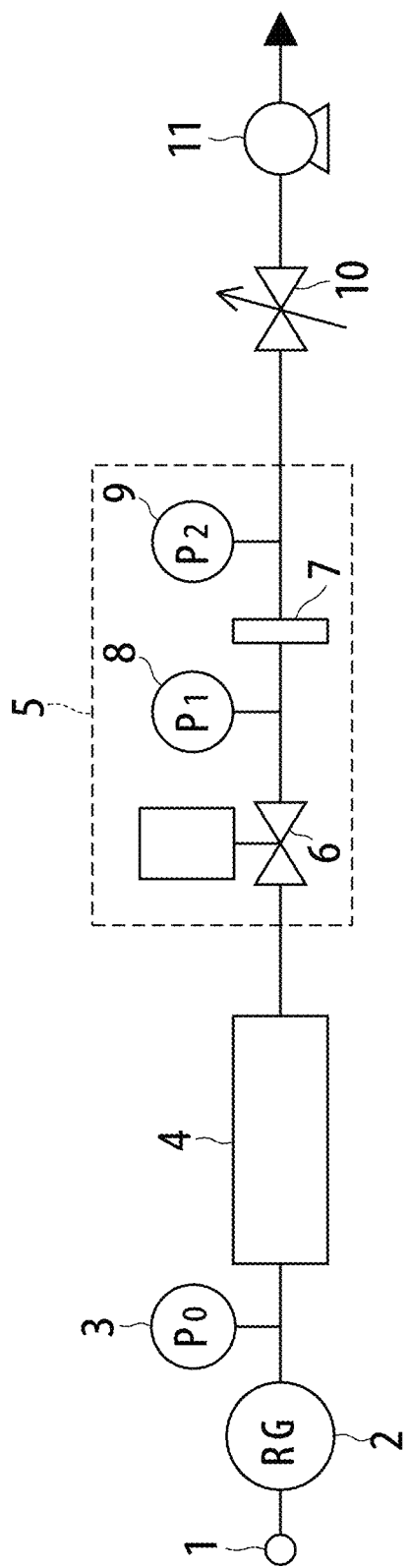
FIG. 1 is a system diagram of a testing device used for testing the orifice flow characteristics.
Figure 2:
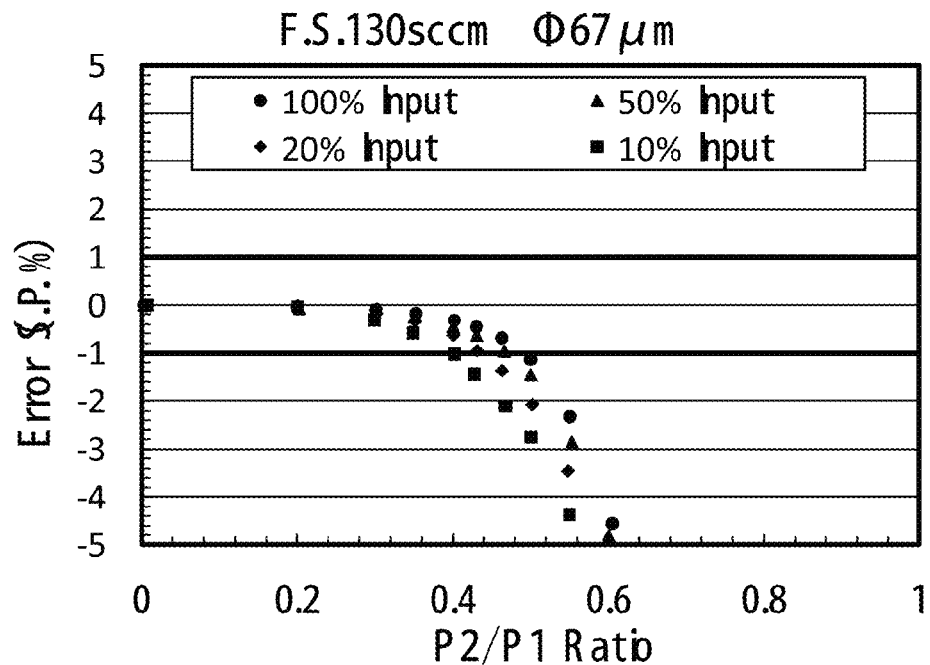
FIG. 2 is a line chart showing the relation between pressure ratio $P_2/P_1$ and set point error (S.P. %) of a pressure-controlled flow controller with F.S. 130 sccm.
Figure 11:
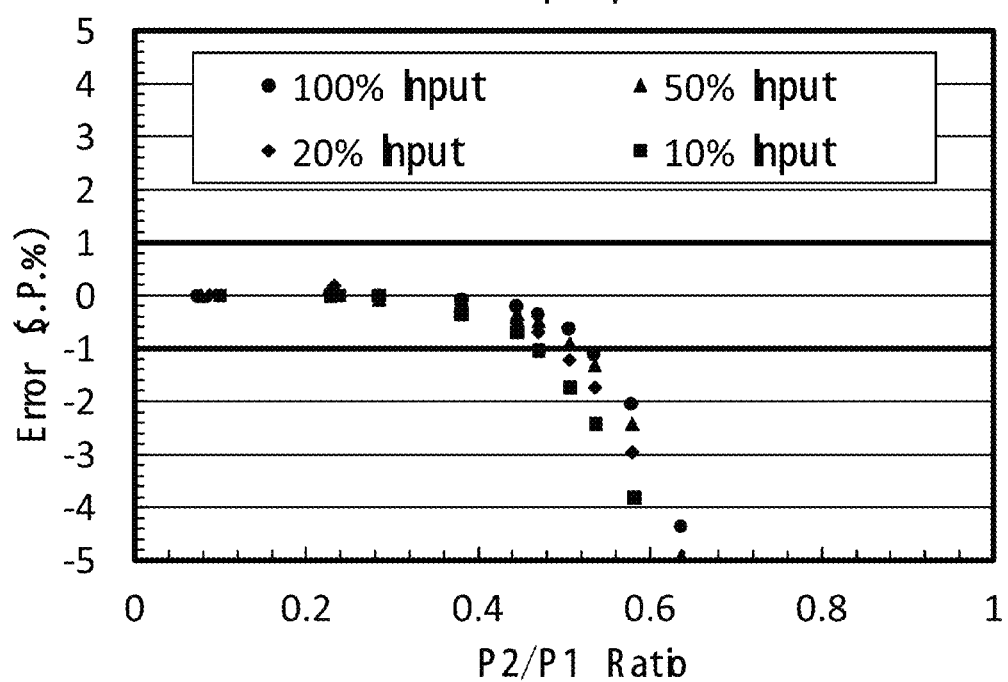
FIG. 11 is a line chart showing relation between the pressure ratio $P_2/P_1$ and the set point error (S.P. %) similar to FIG. 2 to FIG. 4 in the case of using the multi-hole orifice plate of FIG. 10.

FIG. 11 shows a curve similar to FIG. 2, showing the relation with the pressure ratio $P_2/P_1$, wherein the single-hole orifice plate 7 of the tester of FIG. 1 is replaced by the multi-hole orifice plate 7a of FIG. 10.

As is clear from the comparison between FIG. 11 and FIG. 2, in the case of the multi-hole orifice plate 7a of the present invention, the pressure ratio $P_2/P_1$ value at which the set point error (S.P. %) is within a range of ±1% does not fall below 0.45 even at the time of 10% input (10% of the set flow rate). At the time of 100% input (100% of the set flow rate), the $P_2/P_1$ value of about 0.52 can be obtained.

Figure 3:
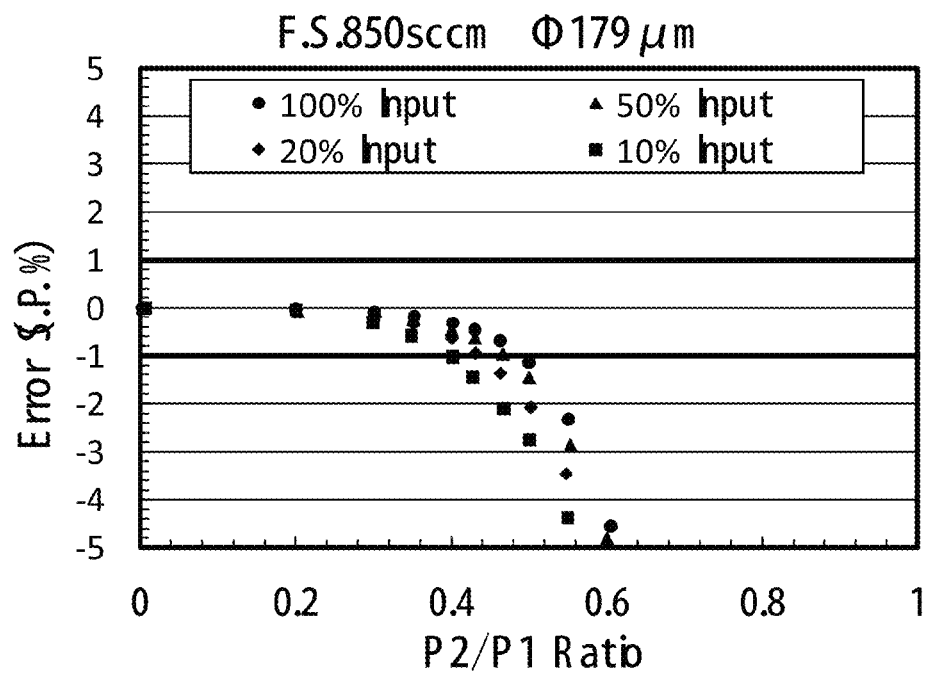
FIG. 3 is a line chart similar to FIG. 2 with F.S. 850 sccm.
Figure 4:
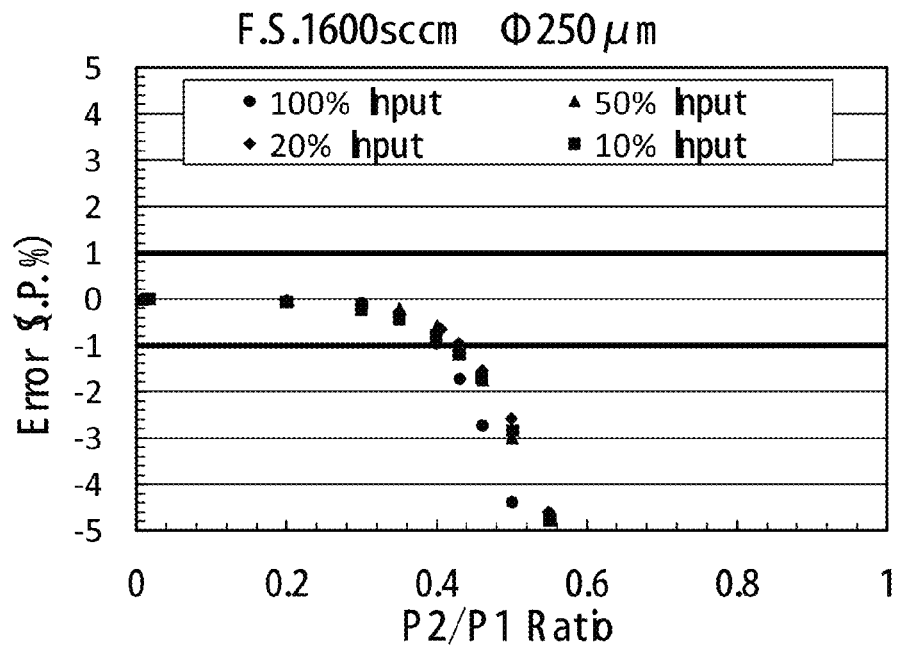
FIG. 4 is a line chart similar to FIG. 2 with F.S. 1600 sccm.

In contrast, in FIG. 3 in which the maximum flow rate is 850 sccm, the pressure ratio $P_2/P_1$ at the time of 100% input is about 0.42. Even in FIG. 4 in which the maximum flow rate is 1600 sccm, the pressure ratio $P_2/P_1$ at the time of 100% input is about 0.40. This shows that in the case where the multi-hole orifice plate 7a of the invention of the present application is used, the range of $P_2/P_1$ whereat critical expansion conditions are established can be expanded. In addition, the reason why the theoretical pressure ratio $P_2/P_1$ whereat critical expansion conditions are established is slightly different from the pressure ratio $P_2/P_1$ at which critical expansion conditions are established in actual measurement as above has not been theoretically analyzed yet and is currently under examination. However, it is assumed that it is affected by differences in the flowing condition of the fluid on the orifice outlet side.

Figure 5:
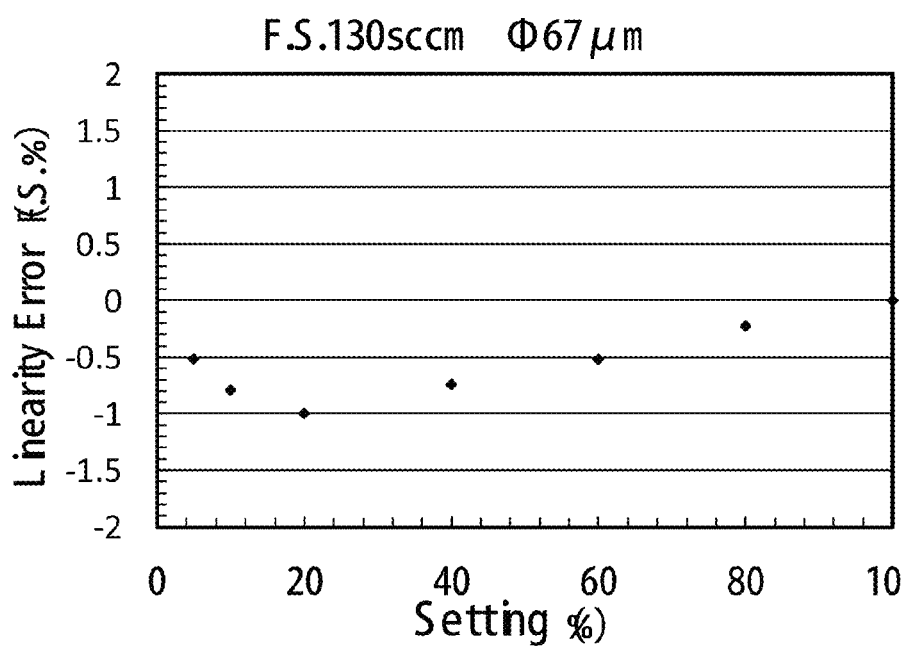
FIG. 5 is a line chart showing the relation between the set flow rate (%) at a pressure ratio $P_2/P_1$ at which the set point error S.P. % is within ±1% and the error relative to full scale (linearity error) (F.S. %), with respect to a pressure-controlled flow controller with F.S. 130 sccm.
Figure 6:
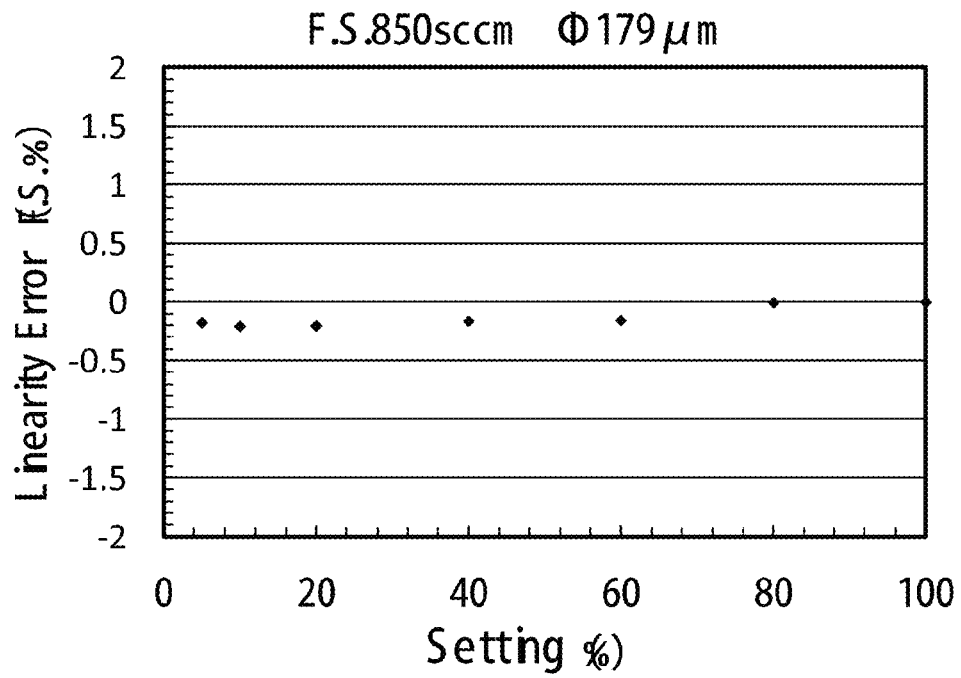
FIG. 6 is a line chart similar to FIG. 5 with F.S. 850 sccm.
Figure 7:
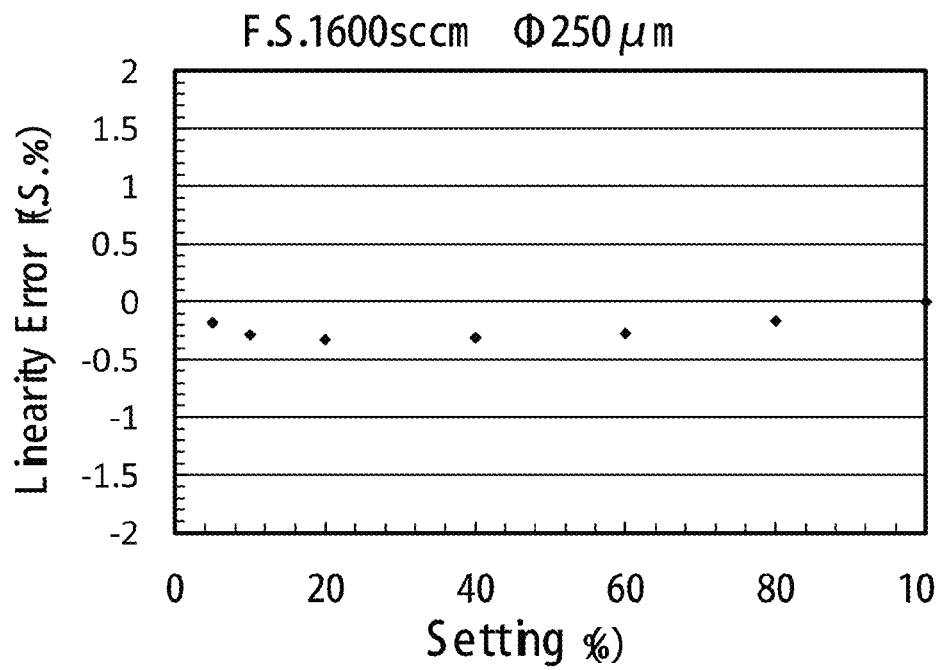
FIG. 7 is a line chart similar to FIG. 5 with F.S. 1600 sccm.
Figure 12:
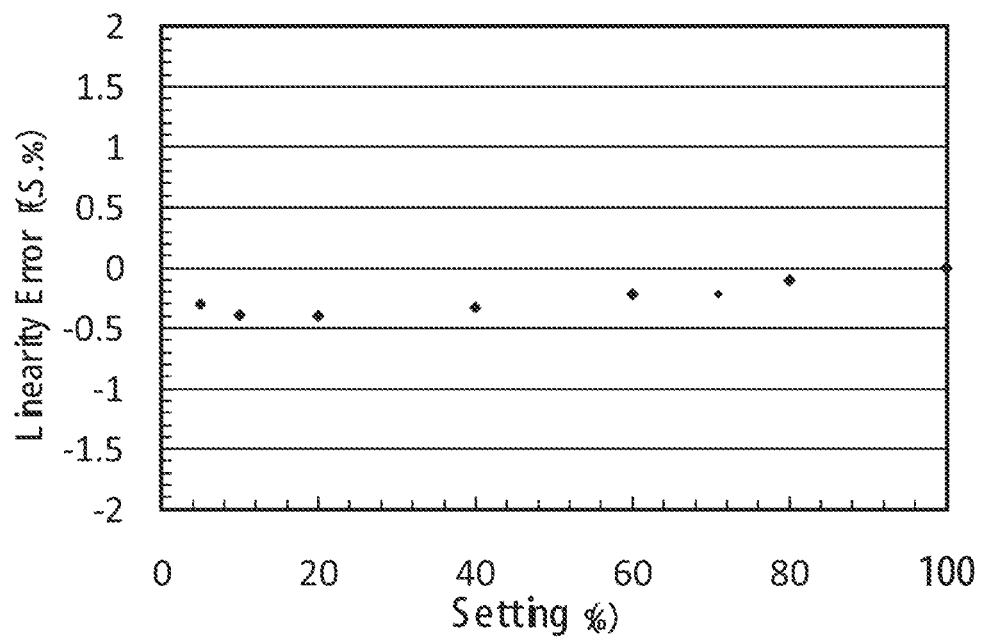
FIG. 12 is a line chart showing relation between the set flow rate (%) and the linearity error (F.S. %) similar to FIG. 5 to FIG. 7 in the case of using the multi-hole orifice plate of FIG. 10.

FIG. 12 is a line chart similar to FIG. 5 in the case of using the multi-hole orifice plate 7a of the present invention. The line chart shows the relation between the set flow rate (%) at a pressure ratio $P_2/P_1$ whereat the set point error (S.P. %) is within ±1% and the error relative to the control flow at the time of 100% setting (flow linear error) (F.S. %).

As clearly shown in FIG. 12, it has been confirmed that the multi-hole orifice plate 7a of the present invention also results in a flow linear error (F.S. %) within ±1% F.S.

Figure 13:
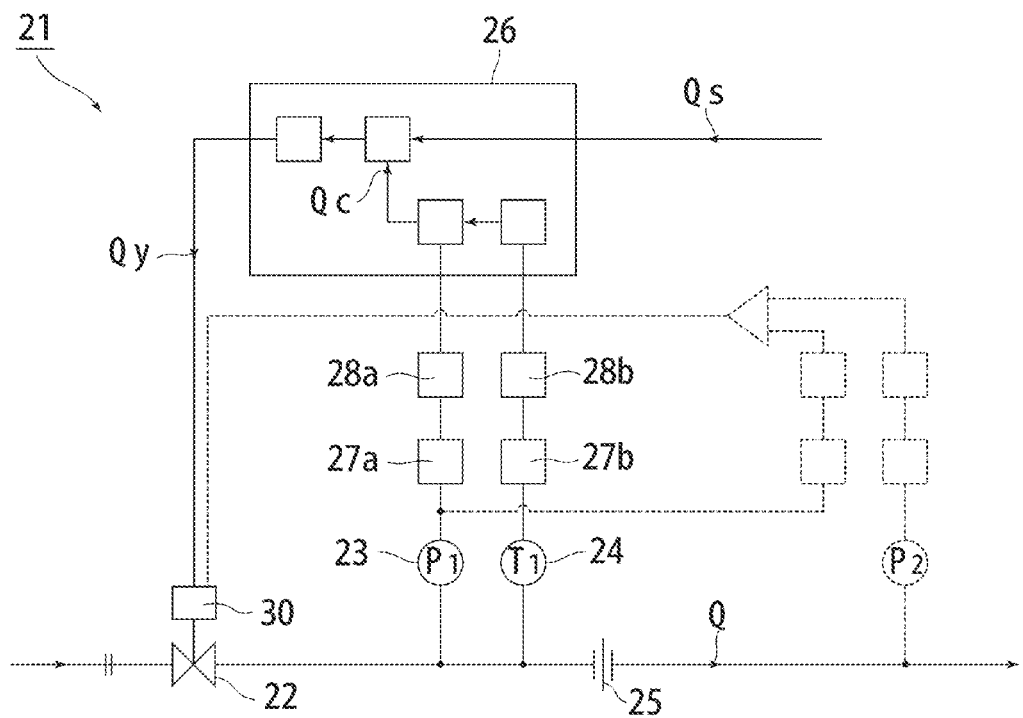
FIG. 13 is a block diagram of a known pressure-controlled flow controller.
Figure 14:
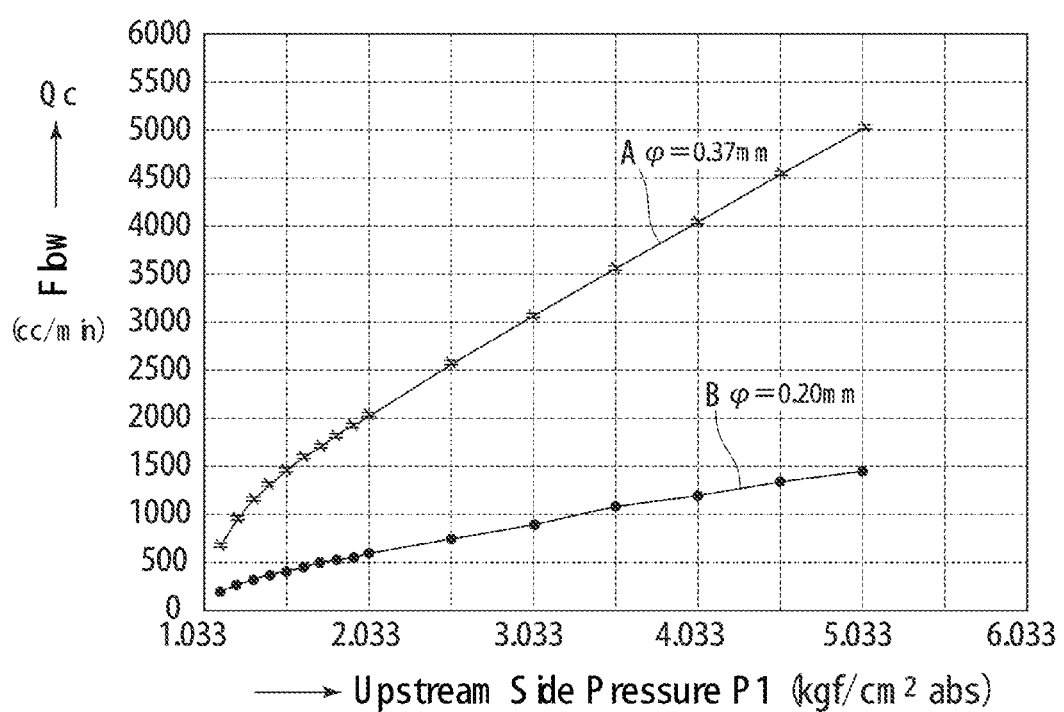
FIG. 14 is a line chart showing the flow control characteristics of the pressure-controlled flow controller of FIG. 13.

In addition, the pressure-controlled flow controller according to the present invention is given by replacing the orifice plate of the Pressure-Controlled Flow Controller F180 manufactured by Fujikin Incorporated, the pressure-controlled flow controller shown in FIG. 13, or the like with the orifice plate of the present invention. Thus, the detailed description will be omitted.

As described above, in the multi-hole orifice plate for flow control and the pressure-controlled flow controller using the same according to the present invention, by adjusting the number of orifices 12 based on the controlled flow rate even when the controlled flow rate increases, the range of the pressure ratio $P_2/P_1$ at which critical expansion conditions are established can be maintained wide and constant, thereby making it possible to perform high-precision flow control stably over a wide range.

INDUSTRIAL APPLICABILITY

The multi-hole orifice plate according to the present invention can be applied not only to a pressure-controlled flow controller but also to any orifices in ordinary orifice devices inserted into a pipeline to control the fluid flow, fluid diverters, etc.

REFERENCE SIGNS LIST

1: Gas inlet
2: Pressure regulator
3: Pressure meter
4: Molblock flow meter
5: Pressure-type flow controller
6: Control valve
7: Orifice plate (single-hole)
7a: Multi-hole orifice plate
8: Pressure detector on the orifice upstream side
9: Pressure detector on the orifice downstream side
10: Regulation valve for the pressure $P_2$ on the orifice downstream side
11: Evacuation pump
$P_1$: Pressure on the orifice upstream side
$P_2$: Pressure on the orifice downstream side
$P_O$: Pressure on the gas supply source side
12: Orifice

The invention claimed is:

1. A multi-hole orifice plate for flow control used in a pressure-controlled flow controller comprising a control valve and a pressure detector, the multi-hole orifice plate having a plurality of orifices,
   wherein the plurality of orifices have a total opening area corresponding to an opening area of a single orifice necessary for the passage of a gas at a rated or full scale flow rate of the pressure-controlled flow controller; and
   wherein the multi-hole orifice plate has a thickness of 20 to 200 μm, the plurality of orifices each have a bore of 0.010 to 0.200 mm, the number of the plurality of orifices is 2 to 100, and the plurality of orifices are formed by pressing.

2. The multi-hole orifice plate for flow control according to claim 1, wherein the plurality of orifices each have a longitudinal plane shape including a rectangular part and a trapezoidal part.

3. The multi-hole orifice plate for flow control according to claim 2, wherein a portion on the back side of the orifice plate having the plurality of orifices bored has a polished finishing surface.

4. The multi-hole orifice plate for flow control according to claim 1, wherein when the ratio $P_2/P_1$ between the pressure ($P_1$) upstream of the orifice plate and the pressure ($P_2$) downstream of the orifice plate is equal to or lower than the pressure ratio at which the critical expansion conditions of a gas are established, the gas flow rate changes in direct proportion to the gas pressure ($P_1$) upstream of the orifice plate.

5. A pressure-controlled flow controller using an orifice plate, wherein the orifice plate is the multi-hole orifice plate for flow control according to claim 1.

6. A pressure-controlled flow controller using an orifice plate, wherein the orifice plate is the multi-hole orifice plate for flow control according to claim 2.

7. A pressure-controlled flow controller using an orifice plate, wherein the orifice plate is the multi-hole orifice plate for flow control according to claim 3.

8. A pressure-controlled flow controller using an orifice plate, wherein the orifice plate is the multi-hole orifice plate for flow control according to claim 4.

9. The multi-hole orifice plate for flow control according to claim 1, wherein the plurality of orifices each have the bore of 0.079 to 0.200 mm, and the number of the plurality of orifices is 2 to 37.

10. The multi-hole orifice plate for flow control according to claim 1, wherein the plurality of orifices each have the bore of 0.079 to 0.135 mm, and the number of the plurality of orifices is 5 to 37.

11. The multi-hole orifice plate for flow control according to claim 1, wherein the plurality of orifices each have different diameters on one side of the orifice plate and the other side of the orifice plate.

12. The multi-hole orifice plate for flow control according to claim 1, wherein the plurality of orifices have same circular shapes and diameters.

* * * * *